May 14, 1940.  J. G. SISSON ET AL  2,200,479
DIAL THICKNESS GAUGE
Filed May 18, 1939
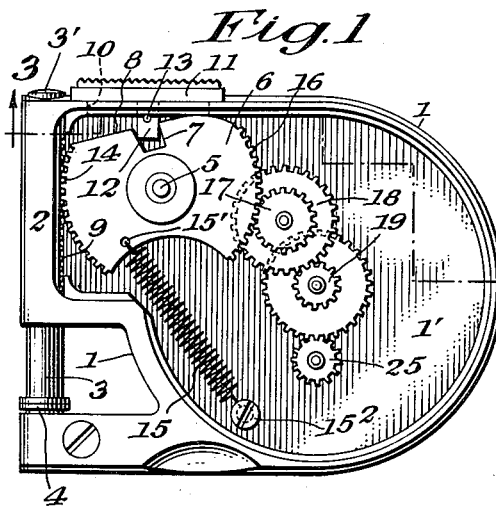
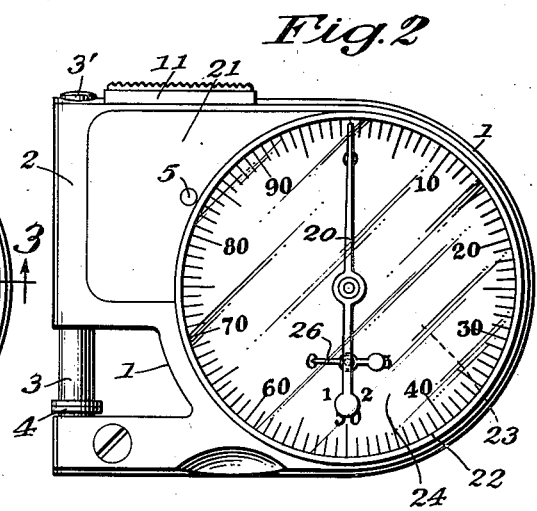
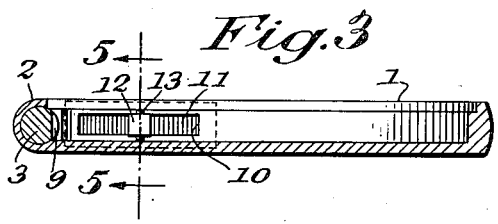
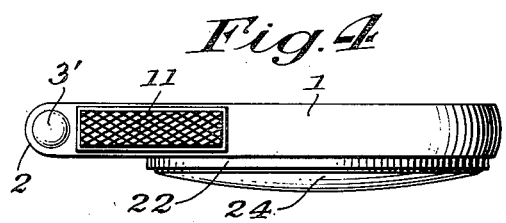
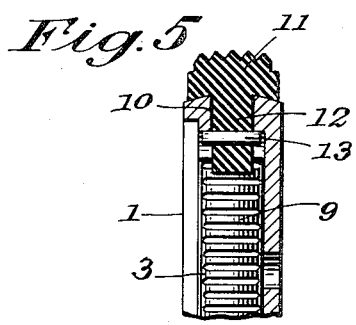
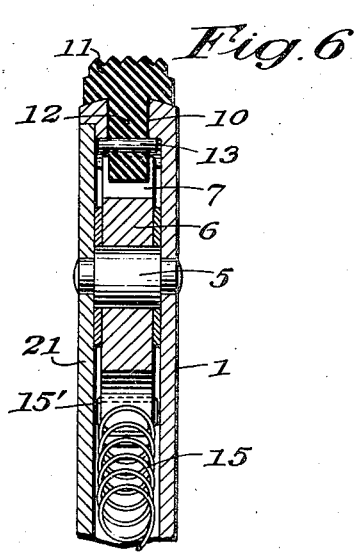
INVENTORS:
James G. Sisson and
Arthur H. Starrett
BY Spear, Rawlings & Spear
ATTORNEYS.

Patented May 14, 1940

2,200,479

UNITED STATES PATENT OFFICE 2,200,479

DIAL THICKNESS GAUGE

James G. Sisson and Arthur H. Starrett, Athol, Mass., assignors to The L. S. Starrett Company, Athol, Mass., a corporation of Massachusetts Application May 18, 1939, Serial No. 274,337

6 Claims. (Cl. 33—147)

In the development of gauges for measuring the thickness of paper, leather, metal sheets or like objects, it has always been desired to have provision made for quick and easy separation of the contact points for receiving the articles to be gauged. Usual practice calls for a single handed manipulation of the gauge so that the other hand of the user may be free to hold the thing being gauged so as to insure proper positioning of the contact points perpendicularly of the opposite flat surfaces available as bases of such measurements, which are usually repeated at different points, to determine uniformity or to average lack of it, if such be the character of the object with reference to predetermined standards.

Of the various types indicated in earlier patents, the provision of a rack on the movable contact point of such a gauge is characteristic as means for moving it away from its opposing fixed contact point by a small pinion meshing with it and itself rotated by a second rack on a plunger or push button stem. Also, the use of a slide on the edge of a casing was shown to rock a lever carrying a segment, which in turn worked a lever for lifting the rack carrying movable contact point.

We are also familiar with a gauge on the market in which the movable contact is separated from its opposed fixed contact by the rotation of one of the gears in a gear train having its periphery exposed through a slot in the casing edge so as to be contactable as by the user's thumb.

The various structures of the prior art display individual difficulties, as by liabliity to accidental operation by unintended contacts, or open to leakage of dust or dirt through the openings of the casing. The present invention avoids these difficulties and provides a simple and efficient gauge capable of commercial production and convenient use. Gauges according to the present invention are easy to operate under a simple sliding pressure of the thumb, so that the movable contact may be separated to wide opening to accommodate material of considerable thickness and all readable upon the indicator dial.

Such an embodiment of our invention is shown in the accompanying drawing and described in the following specification throughout which like reference numerals are employed to indicate corresponding parts. In the drawing:

Fig. 1 is a view of a gauge in accordance with our invention, with cover plate and dial removed to expose the interior.

Fig. 2 is a side view with the removed parts in place.

Fig. 3 shows an inner view of the upper edge of the frame as viewed on the indicated section line 3—3, of Fig. 1, with obscuring interior parts also removed.

Fig. 4 is a plan view of the top of the casing with parts in place.

Fig. 5 shows an enlarged sectional view through the thumb slide and its slot engaging pin as viewed on the indicated line 5—5, of Fig. 3, and Fig. 6 is a similar view but including the sector lever and end of the spring.

Referring to the embodiment shown in the drawing, the casing 1 has a bearing portion 2 for a movable contact 3 opposite to a fixed contact or anvil 4. The top wall of the recess 1' of the casing 1 is slotted as at 10 adjacent the bearing 2 of the movable contact. Just below this slot and pivoted as at 5 is a segment lever 6 having a central notch 7 and an adjacent flattened face 8. The face 8 is so disposed as to contact the inner face of the slotted top wall of the recess 1' so as to limit the rocking of the lever 6 by a knurled slide 11 carrying a depending pin 12 which has a working engagement with the notch 7.

The movable contact 3 has a rack 9 on its side exposed through the inner wall of the bearing 2 and engaged by a segment 14 on the adjacent end of the lever 6 and thus normally held in contact by the fixed contact or anvil 4 with which its end is aligned by the action of the spring 15 which is hooked into the lever at one side of the pivot 5 as at 15' and anchored at its other end as at 15² to the casing.

At its opposite end the lever 6 has a reversely faced toothed segment 16 which may mesh with a gear 17 which is fast to and drives the gear 18 which turns the pinion 19 of the indicator hand 20.

The front of the hollow casing 1 is closed by a plate 21 formed with a shallow cup 22 for receiving the graduated dial 23 which is covered by a crystal and bezel 24.

The slide 11 is held snugly to the slightly rounded top edge of the casing by a key 13 which passes through the pin 12 transversely of the slot bottom. It thus rides the inner edge of the slot, guiding and steadying the slide as it is moved by the thumb of the user. As the slide moves over the slot with a wiping motion, there is no tendency for dirt to be carried into the interior of the casing as would be the case where a rotatable gear is exposed beyond the casing and moved so that its periphery travels inward through its partly filled, but otherwise uncovered slot.

The upper end of the movable contact member 3 is preferably slightly convexed or rounded as at 3' so that there is no tendency for dirt to gather against it if the gauge is carried in a user's pocket. In fact, the usual thumb contact with the knurled slide tends in itself to wipe it and adjacent surfaces in applying the sliding pressure to move it against the pull of the tensioned spring 15 which constantly tends to snap it to closed position.

The indicator preferably includes in its train an auxiliary pinion 25 turning a hand 26 which may turn past numbered points representing numbers of full turns of the main hand 20 if it makes more than one revolution during the opening of the movable contact.

While gauges may be made very thin and flat so that they can be held in the palm of the hand, they are capable of being given a wide range in thickness measurements and work capacity.

The movable slide, under the action of the thumb, transmits a very even balanced motion to the segmental member 6 when being retracted to raise the movable contact 3 so as to enter the work to be gauged. Also, being a low flat slide as it preferably is, it is not apt to catch on the clothing when carried in the pocket and as it makes a tight seal for the casing successfully prevents any entrance of dirt within its cavity. Such a slide may be and preferably is formed of a condensation product or like artificial noncorrodable material so that it is not affected either by perspiration on the thumb of the user, or by oil in handling, and as the slide moves externally of the casing it cannot act as a dirt feeder to the casing interior, as where an externally moving part enters the casing from without, so that it can carry dirt within.

Various modifications may be resorted to all without departing from the spirit and scope of our invention if within the limits of the appended claims.

What we therefore claim and desire to secure by Letters Patent is:

1. In an indicator gauge, a frame, a fixed and a slidable contact aligned with each other on said frame, an indicator dial and a geared pointer rotatably actuated from said slidable contact, a rack on said slidable contact, said frame having a slot through one edge, a slide piece mounted over said slot, a lever pivotally mounted below said slot and having a marginal notch, a pin on the slide piece and extending through the frame slot and engaging said notch to rock the lever in one direction, said lever having a pair of oppositely disposed toothed segments, one meshing with the slidable contact rack and the other meshing with a hand pinion, and an extensible return spring engaging the lever on the side of the rack engaging segment at one end and anchored within the frame so as to yieldably oppose the movement of the slide piece in one direction.

2. In an indicator gauge, a frame, a fixed and a slidable contact aligned with each other on said frame, an indicator dial and a geared pointer rotatably actuated from said slidable contact, a rack on said slidable contact, said frame having a slot through one edge, a slide piece mounted over said slot, a lever pivotally mounted below said slot and having a marginal notch, a pin on the slide piece and extending through the frame slot and engaging said notch to rock the lever in one direction, a retainer key through the slide pin and movably bearing under the inner edge of the frame slot to hold the slide against the outer edge of said slot so as to substantially cover the same, said lever having a pair of oppositely disposed toothed segments, one meshing with the slidable contact rack and the other meshing with a hand pinion, and an extensible return spring engaging the lever on the side of the rack engaging segment at one end and anchored within the frame so as to yieldably oppose the movement of the slide piece in one direction.

3. In an indicator gauge, a frame, a fixed and a slidable contact aligned with each other on said frame, an indicator dial and a geared pointer rotatably actuated from said slidable contact, a rack on said slidable contact, said frame having a slot through one edge, a slide piece mounted over said slot, a lever pivotally mounted below said slot and having a marginal notch, a pin on the slide piece and extending through the frame slot and engaging said notch to rock the lever in one direction, said lever having a pair of oppositely disposed toothed segments, one meshing with the slidable contact rack and the other meshing with a hand pinion, said lever having a flat face intermediate its rack engaging sector and its pin notch and adapted to contact the inner face of the frame as a stop and inner seal for the slot slide, and an extensible return spring engaging the lever at one end and anchored within the frame so as to yieldably urge the lever face against the inner face of the frame.

4. In a dial thickness gauge, a frame having an interior cavity, a contact slidably guided adjacent one edge thereof, a fixed contact disposed on the frame opposite the end of the slidable contact, a rack on the slidable contact and exposed in the frame interior, a toothed segment meshed in said rack, an indicator hand pinion, an intermeshing gearing operatively connecting said rack segment and hand pinion enclosed within said frame and including a part disposed for movement adjacent the inner edge face of one wall of the cavity, a contact control including a thumb piece slidably mounted on one edge of the frame and having a part projecting through its subjacent wall and tangentially effective on said gearing part, and a retractor spring in said frame interior and disposed yieldingly to resist the motion of the thumb piece in its spindle retractive movement.

5. In a dial thickness gauge, a frame having an interior cavity, a contact slidably guided adjacent one edge thereof, a fixed contact disposed on the frame opposite the end of the slidable contact, a rack on the slidable contact and exposed in the frame interior, a toothed member meshed in said rack, an indicator hand pinion, an intermeshing gear operatively connecting said rack member and hand pinion, a contact control including a thumb piece slidably mounted at one side of the frame and through a wall of said interior cavity, means on the inner edge of said thumb piece for imparting movement to the toothed member meshed in the rack, and a retractor spring in said frame interior and disposed to yieldingly resist the motion of the thumb piece in its spindle sliding retractive movement.

6. In a dial thickness gauge, a relatively shallow frame including a semi-cylindrical recess, an indicator hand pinion journaled substantially in the axis of said recess, said frame having an overhanging bearing portion disposed tangentially of the curvature of the cylindrical portion of the frame, a contact slidably guided in said bearing portion, a fixed contact disposed on the frame opposite to the line of movement of said slidable contact, resilient means for urging the slidable contact toward the fixed contact, the edge of the frame adjacent said overhanging bearing portion being formed as a slotted slidway perpendicular to the line of movement of said slidable contact, a rack on the inner side of said slidable contact, geared connection between said contact rack and said indicator hand pinion, a control slide movably mounted externally on said slotted slideway and having a positive operative association internally with said geared connection, whereby the reciprocation of the slide at right angles to the slidable contact simultaneously lifts the slidable contact and effects rotative influence on the pointer pinion of the indicator hand, and a side cover on said hollow frame including a circular dial and bezel mounted on said hollow frame concentric with the cylindricity thereof.

JAMES G. SISSON.
ARTHUR H. STARRETT.